United States Patent [19]

Grewal et al.

[11] Patent Number: 5,592,672
[45] Date of Patent: Jan. 7, 1997

[54] SYSTEM FOR LOAD BALANCING BETWEEN MESSAGE PROCESSORS BY ROUTING ALL QUEUED MESSAGES TO A PARTICULAR PROCESSOR SELECTED BY A DETERMINISTIC RULE

[75] Inventors: Kalwant S. Grewal, Long Valley; Jagdish A. Patel, Piscataway; Tzyh-Jong Wang, Edison, all of N.J.

[73] Assignee: Bell Communications Research, Inc., Morristown, N.J.

[21] Appl. No.: 588,279

[22] Filed: Jan. 18, 1996

Related U.S. Application Data

[63] Continuation of Ser. No. 146,249, Nov. 2, 1993, abandoned.
[51] Int. Cl.$^6$ .................................................. G06F 15/16
[52] U.S. Cl. ..................................... 395/200.15; 395/680
[58] Field of Search ................................... 395/250, 650; 370/58.2, 60

[56] References Cited

U.S. PATENT DOCUMENTS

| | | | |
|---|---|---|---|
| 4,633,387 | 12/1986 | Hartung et al. | 395/650 |
| 4,694,483 | 9/1987 | Cheung | 379/34 |
| 4,821,265 | 4/1989 | Albal et al. | 370/110.1 |
| 4,868,866 | 9/1989 | Williams, Jr. | 380/49 |
| 5,179,557 | 1/1993 | Kudo | 370/94.1 |
| 5,365,519 | 11/1994 | Kozaki et al. | 370/60 |

OTHER PUBLICATIONS

Chipalkatti et al., "Scheduling Policies for Real-Time and Non-Real-Time Traffic in a Statistical Multiplexer," 1989, IEEE.
Zhu et al., "Adaptive Threshold-based Scheduling for Real-Time an Non-Real-Time Traffic," 1992, IEEE.
Chang et al., "Adaptive Bandwidth Balancing on DQDB Networks," 1992, IEEE.
"The Design and Analysis of a Semidynamic Deterministic Routing Rule", Yak-Shing P. Yum, IEEE Transactions on Communications, vol., Com–29, No. 4, Apr. 1981, pp. 498–504.

*Primary Examiner*—Richard L. Ellis
*Attorney, Agent, or Firm*—Joseph Giordano

[57] ABSTRACT

A service control point having multiple independent control processor and multiple front end communication processors incorporates a deterministic rule message distribution process for balancing the traffic load among the front end processors from all the independent control processors. The deterministic rule method is applied independently in each control processor and queues all outgoing messages in one of three queues; those that must be transmitted on Linkset-0, those that must be transmitted on Linkset-1, and those that can be transmitted on either linkset. Our message distribution process keeps all messages in queue until message number or timer threshold is reached. The traffic is routed to a front end processor such that the resulting distribution is closest to the expected distribution.

13 Claims, 2 Drawing Sheets

SYSTEM FOR LOAD BALANCING BETWEEN MESSAGE PROCESSORS BY ROUTING ALL QUEUED MESSAGES TO A PARTICULAR PROCESSOR SELECTED BY A DETERMINISTIC RULE

This application is a continuation of application Ser. No. 08/146,249, filed Nov. 2, 1993 now abandoned.

TECHNICAL FIELD OF THE INVENTION

This invention relates to a method and system for minimizing traffic congestion from multiple sources at multiple outgoing processors where the traffic arrives randomly. More specifically, this invention relates to deterministically distributing traffic to multiple front end processors from multiple control processors in an intelligent telecommunications network service control point (SCP).

BACKGROUND OF THE INVENTION

The modern intelligent telephone network is essentially composed of three functional elements. These are service switching points (SSPs), signalling transfer points (STPs), and service control points (SCPs). When a telephone user attempts to make a telephone call, the SSP is the first network element with which the user interacts. The SSP is a system that provides part of the intelligence in the intelligent network. It receives information from the user and determines if some form of special handling is required. For example, if the user had dialed an 800 number, the SSP, upon recognizing the 800 number, would know it would require detailed information for processing the call. The SSP would then send a query message through the company's signalling network to a service control point (SCP) to obtain the call processing information. The service control point (SCP) would process the query message and search its database for the customer record identified by the 800 number in the query message. The SCP would extract the necessary call processing information from the customer record in the database and package this information in a response message to be sent back through the signalling network to the SSP that sent the initial query.

The SCP as the service controller sits at the top of the intelligent network topology. Within a telephone region there may be one SCP pair (the pair is for reliability purposes) that is accessed by a pair of regional signalling transfer points (STPs) which in turn have access to several pairs of local signalling transfer points (STPs). Therefore, between each SCP pair and the paired set of STPs directly connected to it are two signalling linksets. Each signalling linkset consists of multiple (1 to 15) links. In the art, one linkset between an SCP and one of STPs in the paired set is call Linkset-0. The other linkset between the SCP and the other STP of the paired set is known in the art as Linkset-1.

At the bottom of the network topology connected to the local STPs are a wide plurality of service switching points (SSPs) which provide the direct contact to the telephone customers in providing telephone services. With one SCP pair supporting such a wide number of STPs and SSPs, and as more advanced and customized services are provided by the telephone service providers, the volume of message requests received at the SCP is becoming very large. Consequently, the SCP has taken on critical importance as the "real brains" in the intelligent network. Furthermore, because the multiple sources of the messages are all initiated independently by customers when they request service, the message traffic at the SCP arrives according to random processes. It is therefore important that the message processing performance of an SCP meet strict long term performance standards and also that the SCP be able to avoid or alleviate congestion in its handling peak message traffic loads that undoubtedly and periodically occur.

Bell Communications Research Inc. (Bellcore) has developed an SCP architecture and software that has been deployed and used to great success in the telephone operations of many telephone companies including the Regional Bell Operating Companies. The current standard configuration of Bellcore's SCP includes eight front ends (FEs) that connect and interface the SCP with the common channel signalling network (i.e. the STPs) and three (3) to five (5) Control Processors (CPs) which process database queries as required to provide the 800 and Alternate Billing Services. Each of the front end processors has links to both linksets (Linkset-0 and Linkset-1) connecting the SCP to the STPs. Having multiple front end processors and control processors operating independently is necessary to assure overall reliability and response time performance of the SCP in providing high quality telephone services.

In the current SCP architecture, one of the problems that had to be addressed was the routing of outgoing messages to multiple front end processors from multiple independent control processors and the distribution of the traffic among the front end processors when the query messages arrive at the control processors according to a random process. The current method for routing the outgoing messages from each of the independent control processors has been to use a stochastic rule to distribute message traffic among the front end processors.

Simply stated, the prior art stochastic method of distributing traffic to all the front end processors is to have each control processor, using a random number generator, route each message to a front end processor based on the random number generated. With this approach, each control processor operates independently, routing its own traffic randomly to each of the front end processors.

Experience, however, has shown that although the stochastic rule will equally distribute the traffic load across the front end processors over long time periods, load imbalances over short periods of time, to the point of causing congestion and thereby discarding messages, have been observed. The following example illustrates this point. Let us assume an SCP has 8 Front End processors (FEs) and 5 Control Processors (CPs). Further assume that an FE goes into congestion if it has to handle more than 65 queries (or messages) per second, while the CP can handle about 100 queries per second. Also assume that incoming traffic is Poisson distributed and is arriving at a Poisson mean rate of 450 queries per second. Using the prior art stochastic algorithm to route the traffic, it is possible that all 5 CPs could send a buffer of 12 messages to a given FE at the same time. Furthermore, after this FE receives all 5 buffers, it is possible that one of the CP's could send another full buffer of 12 messages to the same FE. For an SCP in the Signalling System 7 (SS7) network, the probability of an FE receiving 5 buffers (one from each CP) and then receiving another buffer from one CP in quick succession (e.g. within 10–15 milliseconds) is about $1.12 \times 10^{-5}$ When this happens, the FE needs to handle 72 messages in a very short time. Since it is only able to handle 65 queries per second, it will experience transmit congestion and start discarding messages until congestion abates. At the incoming traffic rate of 450 queries per second, we estimate that one of the 8 FEs will experience congestion about every 25 minutes. For other SCP configurations, congestion may occur more frequently. For example, in a configuration with 6 FEs and 4 CPs, at a traffic arrival rate of 300 queries per second, congestion is expected, and in practice was observed, about every 3 to 5 minutes. Therefore, it is an object of our invention to control the message traffic load at the front end processors so as to eliminate short term load imbalances.

In the prior art, other routing methods have been examined. For example, Tak-Shing P. Yum in his paper entitled "The Design and Analysis of a Semidynamic Deterministic Routing Rule", published in IEEE Transactions on Communications, Vol. 29, No. 4, April 1981, examines a best deterministic rule for minimizing waiting times in a common channel signalling network. The best deterministic rule disclosed by Mr. Yum is one where instead of distributing the traffic to different queues randomly, it is distributed according to a calculable routing sequence. Mr. Yum showed that this best deterministic rule can maintain equal utilization of signalling links in the network while reducing average waiting times. However, Mr. Yum's method processes individual messages, while current SCPs process blocks containing a variable number of messages. A direct application of Mr. Yum's algorithm to the SCP at the block level would result in a traffic imbalance among the FEs. The differences in the number of messages per block at the front end processors further compound the problem of trying to maintain the load balance (i.e. processing load) across the front end processors. It is therefore a further object of our invention to incorporate into a deterministic method for routing traffic in an SCP the need to accommodate variability in the number of messages per block on equalizing the processing load of the front end processors.

SUMMARY OF THE INVENTION

Our invention is an SCP that uses deterministic routing rules for routing message traffic from the control processors to the front-end processors and a method for routing traffic in an SCP that balances the outgoing load in the front end processors. Our method comprises the steps of placing outgoing messages from an SCP into one of three queues. One of the queues is for messages intended for Linkset-0 only, a second queue is for messages intended for Linkset-1 only, and a third queue is for messages intended for either set of links. When the total number of messages in all queues combined equals 12 or when the oldest message has been in queue for 200 milliseconds, the messages are sent to a front end processor such that the resulting distribution is closest to the expected distribution.

DETAILED DESCRIPTION

Figure 1:
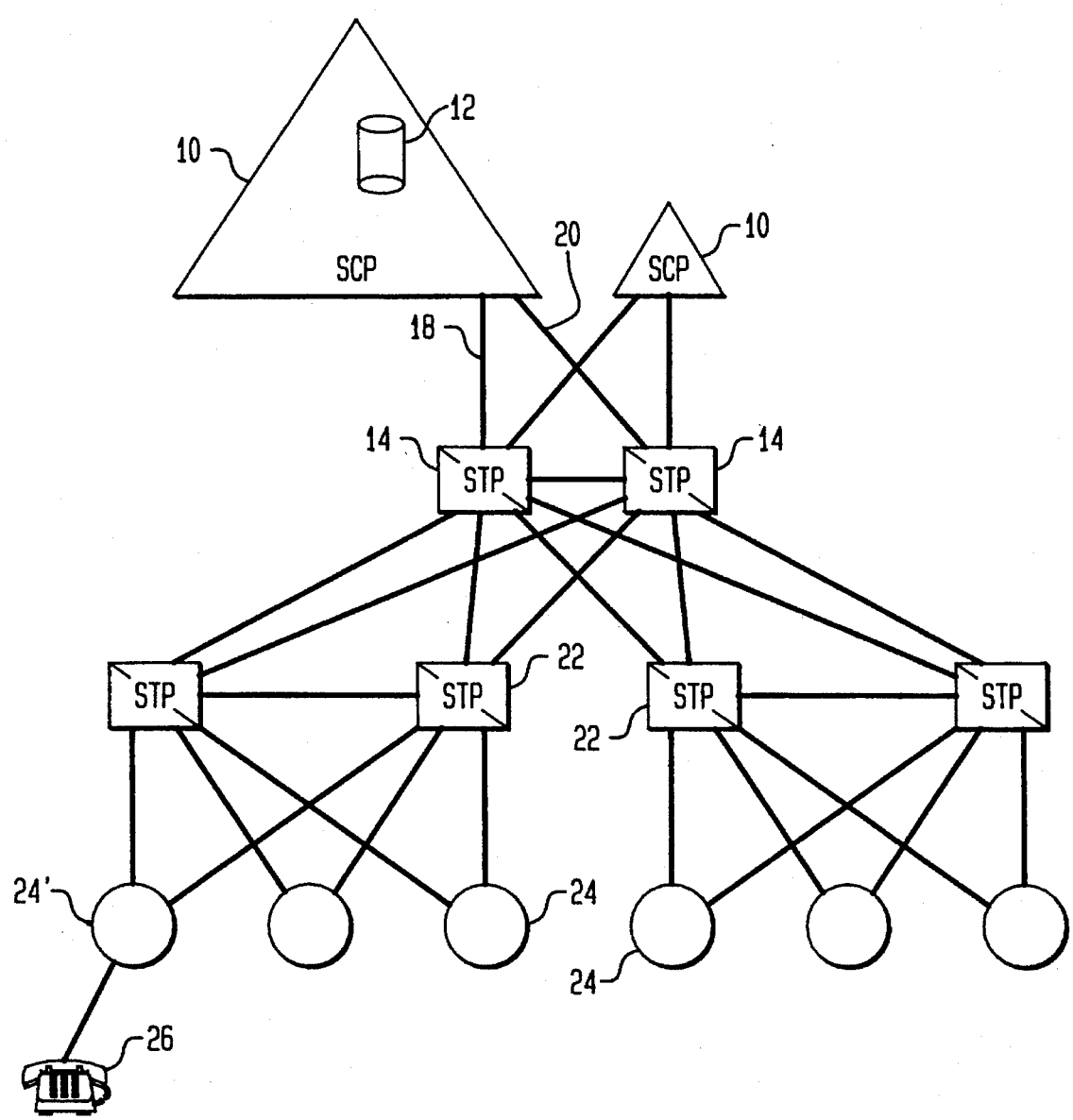
FIG. 1 depicts the intelligent network topology.

FIG. 1 illustrates the general network topology for the intelligent network. At the top of the topology are the paired set of service control points (SCPs) 10. Connecting the SCPs 10 to the paired set of regional signalling transfer points 14 are Linksets 0 and 1, 18 and 20. The regional STPs 14 are connected to the local STPs 22 which in turn are connected to a plurality of SSPs 24. When a user 26 makes a phone call, SSP 24' would determine if special call processing instructions were necessary from SCP 10. If necessary, SSP 24' would send a call processing information request message through the STPs 22 which would route the message through STPs 14 to SCP 10. SCP 10 would obtain the required call processing information from its call processing record from database 12. The SCP 10 would then forward the response message containing the call processing information over either Linkset-0 or Linkset-1 to STPs 14 which would forward the information through STP 22 to SSP 24'. SSP 24' then uses the call processing information received to complete the call from user 26.

Figure 2:
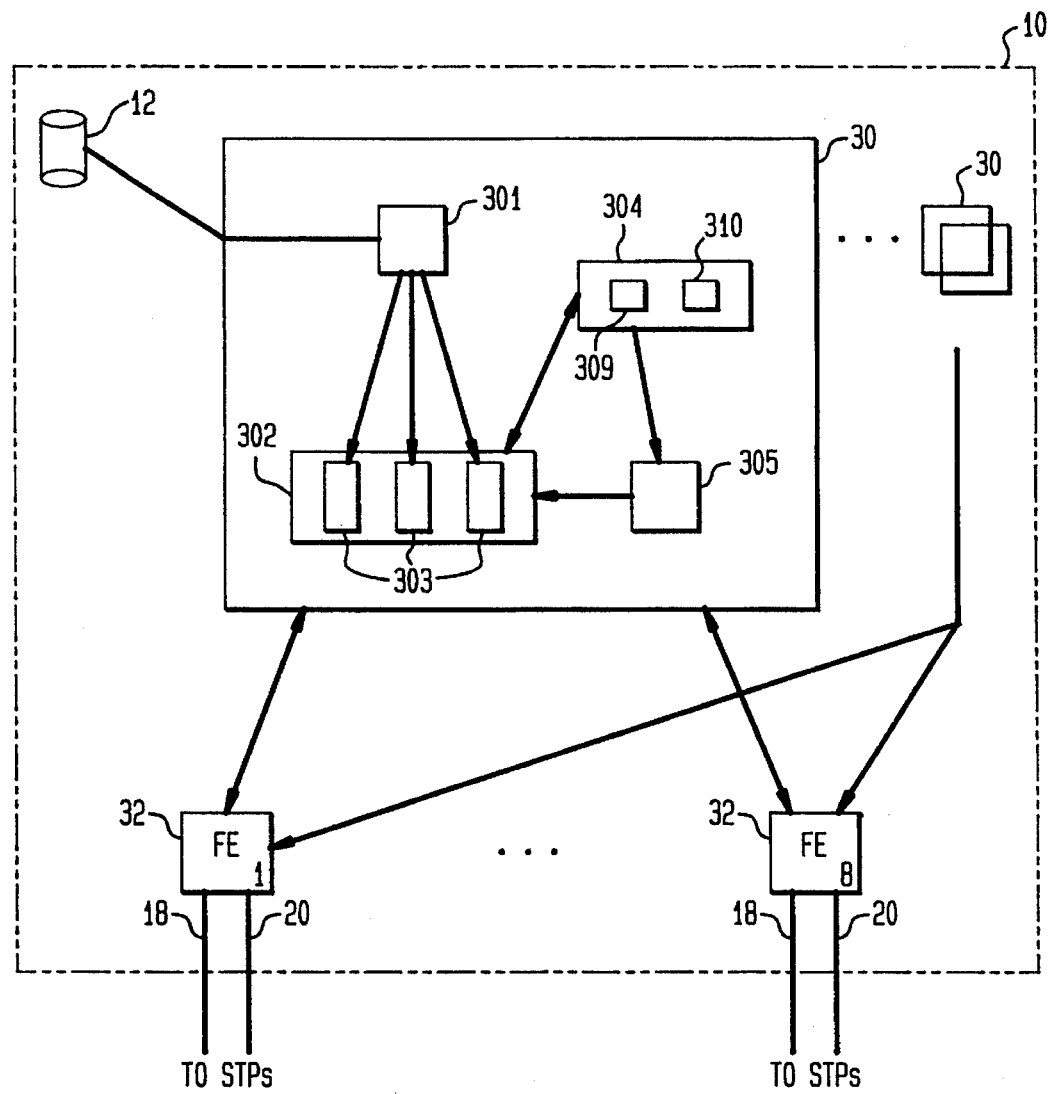
FIG. 2 illustrates the architecture of our Signalling Control Point (SCP).

Our inventive SCP that incorporates our inventive method is illustrated in FIG. 2. The SCP 10 is comprised of a plurality of independent control processors 30 connected to a greater plurality of front end processors 32, $FE_{1...8}$. Each front end processor has one link in Linkset-0 18 and one link in Linkset-1 20 . As message traffic arrives randomly on Linkset-0 or Linkset-1 it is forwarded from front end processors $FE_{1...8}$ to one of the control processors 30. The traffic is distributed among the independent control processors 30 according to any of the known prior art stochastic rules for distributing traffic. The control processor 30 then queries the database 12 for the appropriate call processing record. After the control processor 30 accesses the call processing record, a message assembly process 301 formulates a response message to be returned to the SSP 24'. The message assembly process determines whether the message must be transmitted on a specific linkset or the combined linkset according to a routing table that tracks which STPs and SSPs are reachable on either or both of the linksets. This outbound traffic distribution is accomplished by the SCP by assigning a five bit message steering code, called Signalling Link Selection (SLS) codes, to each message to be transmitted. The distribution of traffic over the linksets is not the subject our invention. The manner in which the traffic on the links is determined is well known in the art. (see TR-NPL-000246, Issue 2, December 1992, published by Bell Communications Research, entitled "Specification for Signalling System 7"). Once the message assembly process 301 determines which linkset the message is to be transmitted over it places the formulated message in the one of three queues 303 established in memory 302. One queue is for traffic that must be transmitted on Linkset-0, one queue is for traffic that must be transmitted on Linkset-1, and one queue is for traffic that can be transmitted over either linkset. Once the first message is placed in queue, our SCP invokes a counting and timing process 304 including counter 309 and timer 310. This process 304 counts the total number of messages in all three queues in counter 309 and also runs the timer 310. When the total number of messages in all three queues equal 12 or when the timer 310 reaches 200 milliseconds, the counting and timing process 304 informs the message distribution process 305 that all messages in memory 302 should be transmitted to the appropriate front end processor for transmission over the links.

The message distribution process 305 is the heart of our inventive SCP and incorporates our deterministic rule distribution method for managing the processing load across the front end processors $FE_{1...8}$. Our message distribution process keeps track of the expected load for each front end processor 32. For illustrative purposes, if the load is to be divided equally amongst each of the front end processors $FE_{1...8}$, than each processor should expect ⅛th of all the message traffic. However, it isn't necessary for our inventive method that each front end processor handle an equal load. Under certain situations, e.g. link failures, certain links (and therefore front end processors) are designated to carry a higher percentage of traffic. Our method can also accommodate front end processors with different processing capabilities. In either case, for each queue the message distribution process 305 keeps track of the expected message processing rate of each processor in the form of a ratio of expected messages to be processed over total messages processed. Lets call these ratios the expected ratios ($P_1, \ldots P_8$) for front end processors FE $_{1 \ldots 8}$. Our method also keeps track of the current ratios defined as the number of messages sent to each front end processor over total messages processed; we call these ratios ($Q_1, \ldots Q_N, \ldots, Q_8$). The ratio Q is composed of the number of messages sent to a front end processor N from this one control processor divided by T, the total messages processed by the control processor. The next step in our inventive method, as incorporated in our message distribution process 305, is to calculate the difference between the expected traffic distribution and the actual distribution including the messages currently in queue. More specifically, our message distribution process 305 calculates this difference for each front end processor individually, assuming that the messages in the queue are to be transmitted to that processor. For example, the message distribution process 305 would calculate the difference for the front end processors 1 through 8 and select an FE corresponding to the smallest $D_i$ as follows:

$$D_1 = \left| P_1 - \frac{N_1+n}{T+n} \right| + \left| P_2 - \frac{N_2}{T+n} \right| + \ldots + \left| P_8 - \frac{N_8}{T+n} \right|$$

$$D_2 = \left| P_1 - \frac{N_1}{T+n} \right| + \left| P_2 - \frac{N_2+n}{T+n} \right| + \ldots + \left| P_8 - \frac{N_8}{T+n} \right|$$

$$\vdots$$

$$D_8 = \left| P_1 - \frac{N_1}{T+n} \right| + \left| P_2 - \frac{N_2}{T+n} \right| + \ldots + \left| P_8 - \frac{N_8+n}{T+n} \right|$$

$D_1$ is the difference calculated. $N_1$ is the number of messages previously sent to front end processor 1 from this one control processor. n is the total number of messages in a queue. Our message distribution process also calculates the value for $D_2$, which is determined as indicated in the formula except that the message total in queue, n, is added to $N_2$ instead of $N_1$. Values are also calculated for $D_3$ through $D_8$. Our message distribution process then compares all the values calculated for D and sends the block of messages in the queue 303 in memory 302 to the front end processor which has the lowest value for $D_i$. Message distribution process 305 then updates all values for $N_i$, $Q_i$ and T and signals the timing and counting process 304 to reset all values there to zero.

Within our inventive SCP each control processor 30 is comprised of message assembly process 301, memory 302, counting and timing process 304, and message distribution process 305. As a result, at any given time, our method will always send the pending block of traffic in queue to the front end processor that to date has received the least traffic. This method handles blocks of traffic carrying varying messages to be sent over the links. Actual application of our SCP employing our inventive method has shown that the traffic distribution over the front end processors from all the independent control processors converges to and stabilizes at the expected percentages. This result is counter intuitive because standard queuing theory teaches us that random traffic arriving from multiple independent processes is best distributed to a set number of servers using a stochastic process.

It is to be understood that our inventive SCP and method for distributing traffic to multiple front end processors from multiple independent control processors using a deterministic rule as illustrated herein are not limited to the specific forms disclosed and illustrated, but may assume other embodiments limited only by the scope of the appended claims.

We claim:

1. A service controller comprising:
    a plurality of front end communication processors each connected to a signalling link in each of two linksets;
    at least two independent control processors each connected to each of said front end processors with each said control processor comprising:
       a memory for queuing outgoing messages addressed to a signalling link;
       counter means for keeping track of the number of messages in queue;
       timer means for keeping track of the time messages are in queue; and
       message distribution means for using a deterministic rule for routing the messages in said memory to a one of said front end communication processors to control the load on the front and processors as identified by said rule when one of said counter means or said timer means reaches its predetermined threshold value.

2. The service controller of claim 1 wherein said message distribution means comprises:
    memory for storing the expected traffic for each of said front end communication processors;
    memory for storing the actual number of messages sent to each said front end communication processors;
    memory for storing the total number of messages sent to all of said front end communication processors;
    means for adding the number of messages in queue obtained from said counter means to the number of messages actually sent to each one of said front end communication processors;
    means for calculating the differences between said sums of messages sent and said messages in queue and said expected traffic to be sent to said each front end communication processor; and
    means for sending all of said messages in queue as a block to said front end communication processor which has said smallest calculated difference.

3. The service controller of claim 1 wherein said memory comprises three queues, one for queuing messages to be transmitted over a first of said linksets, one for queuing messages to be transmitted over a second of said linksets, and one queue for queuing messages to be transmitted over either of said linksets.

4. The service controller of claim 3 wherein said counter means keeps track of the total number of messages in all of said three queues.

5. The service controller of claim 4 wherein said predetermined threshold value for said counter means equals 12.

6. The service controller of claim 4 wherein said predetermined threshold value for said timer means equals 200 milliseconds.

7. A method for deterministically routing traffic in a service controller from each of a plurality of independent control processors to each of a plurality of front end processors, said method comprising the steps of:
    queuing outgoing messages from said control processor;
    counting the number of messages in queue;
    timing how long the queue contains messages;

tracking the total number of messages sent to each of said front end communication processors;

storing the expected number of messages to be sent to each of said front end communication processors;

determining the difference between the total of the actual traffic sent to each of said front end communication processors and said messages in queue compared to the expected traffic for each of said front end processors; and sending all the messages in queue to said front end processor with the lowest difference in said determining step when the value determined in said counting step or when the value determined in said timing step equals its predetermined threshold.

8. The method as recited in claim 7 wherein said queuing step further comprises the steps of:

queuing in one queue messages that are to be transmitted over a first linkset;

queuing in a second queue messages that are to be transmitted over a second linkset;

queuing in a third queue messages that can be transmitted over either of said linksets;

wherein said counting step comprises the steps of counting the total messages in all of said three queues; and wherein said timing step comprises the step of timing the period a message is in any of said three queues.

9. The method as recited in claim 8 wherein said predetermined threshold for said value determined in said counting step equal 12.

10. The method as recited in claim 8 wherein said predetermined threshold for said value determined in said timing step equal 200 milliseconds.

11. The method as recited in claim 7 wherein the difference determined in said determining step for the traffic sent from one control processor to the first front end processor is calculated according the formula $$D_1 = \left| P_1 - \frac{N_1 + n}{T+n} \right| + \left| P_2 - \frac{N_2}{T+n} \right| + \ldots + \left| P_z - \frac{N_z}{T+n} \right|$$

where $P_i$ is the expected ratio of traffic to be sent to each front end processor over all traffic sent, where $N_i$ is the number of messages sent to each front end processor i, where T is the total number of messages processed by said control processor, where n is the number of messages in said queue, and where z is the total number of front end processors.

12. The method as recited in claim 11 wherein the difference determined in said determining step for the traffic sent from one control processor to the $X^{th}$ front end processor is calculated according the formula $$D_x = \sum_{i=1}^{x-1} \left| P_i - \frac{N_i}{T+n} \right| + \left| P_x - \frac{N_x + n}{T+n} \right| + \sum_{i=x+1}^{z} \left| P_i - \frac{N_i}{T+n} \right|$$

where $P_i$ is the expected ratio of traffic to be sent to each front end processor over all traffic sent, where $N_i$ is the number of messages sent to each front end processor i, where T is the total number of messages processed by said control processor, where n is the number of messages in said queue, and where z is the total number of front end processors.

13. A method for minimizing traffic congestion from multiple independent control processors routing incoming message traffic arriving randomly to multiple front end communication processors for distribution as outgoing messages to alternate linksets, said method comprising:

queuing said outgoing messages in one of three queues depending on whether such outgoing messages are to be distributed over one or the other of said linksets or may be distributed over either of said linksets;

counting the number of messages in each queue;

timing how long said queues contain messages, and upon either said counting step or said timing step reaching its predetermined threshold value transmitting said blocks of messages to the one front end communication processor which has the lowest difference of messages sent and in queue to the number of messages expected to be received at said one front end communication processor.

* * * * *